United States Patent [19]

Loos et al.

[11] 3,955,003
[45] May 4, 1976

[54] PACKAGING CONFECTIONERY PRODUCT

[75] Inventors: Henry W. Loos, Wilmette; Robert J. Oswalt, Glenview, both of Ill.

[73] Assignee: Kraftco Corporation, Glenview, Ill.

[22] Filed: Nov. 13, 1974

[21] Appl. No.: 523,436

[52] U.S. Cl.............................. 426/132; 426/102; 426/305; 426/660
[51] Int. Cl.² ........................................ B65B 55/00
[58] Field of Search ............ 426/113, 128, 214, 98, 426/99, 103, 305, 307, 89, 102, 272, 273, 512, 514, 517, 132, 660

[56] References Cited
UNITED STATES PATENTS

| | | | |
|---|---|---|---|
| 1,613,231 | 1/1927 | Lord et al. | 426/103 |
| 2,019,365 | 10/1935 | Speed | 426/214 |
| 2,555,033 | 5/1951 | Harris | 426/128 X |
| 2,558,234 | 6/1951 | Canfield | 426/307 |
| 2,949,367 | 8/1960 | Goldmeier | 426/214 X |

OTHER PUBLICATIONS

Daniel, A. R., "Up-To-Date Confectionery", 4th Edition, 1965, pp. 412–415, Maclaren & Sons Ltd., Davis House, Croydon, Surrey, England.

*Primary Examiner*—Raymond N. Jones
*Attorney, Agent, or Firm*—Fitch, Even, Tabin & Luedeka

[57] ABSTRACT

A packaged confectionery product is described which is particularly adapted for use with another food product. More particularly, a caramel sheet is provided and packaged in a particular manner to permit edge standing of the caramel sheet and later utilization of the caramel sheet for enrobing an apple. A unique process is described for preparing and packaging a confectionery product, such as a caramel sheet, and for enrobing a food product, as for example an apple.

13 Claims, 8 Drawing Figures

U.S. Patent    May 4, 1976    3,955,003
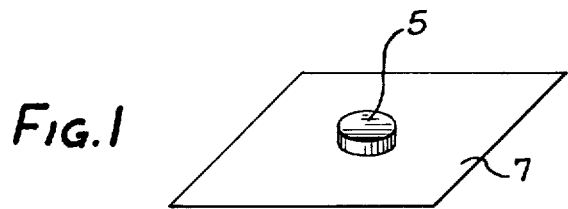
FIG.1
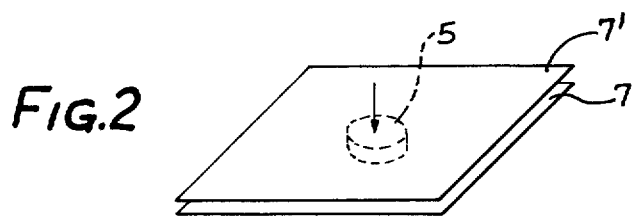
FIG.2
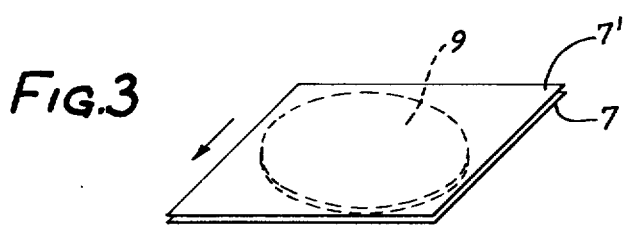
FIG.3
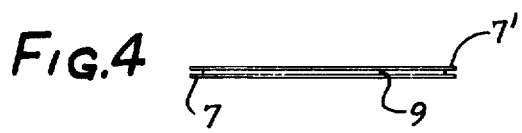
FIG.4
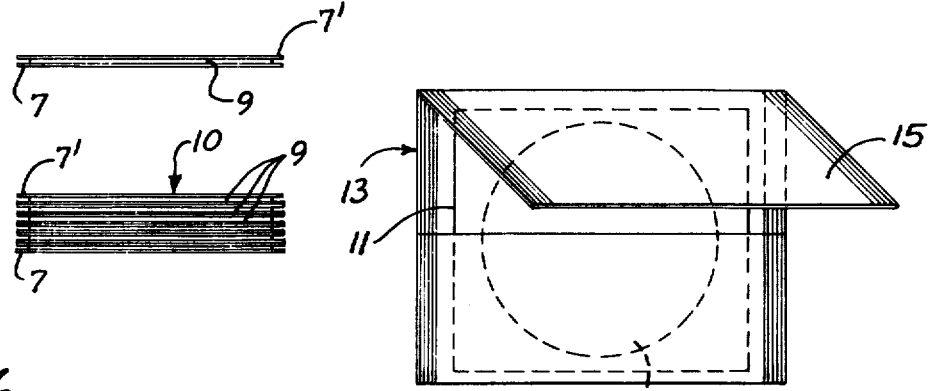
FIG.5
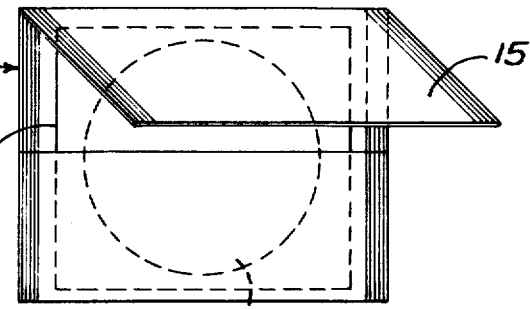
FIG.6
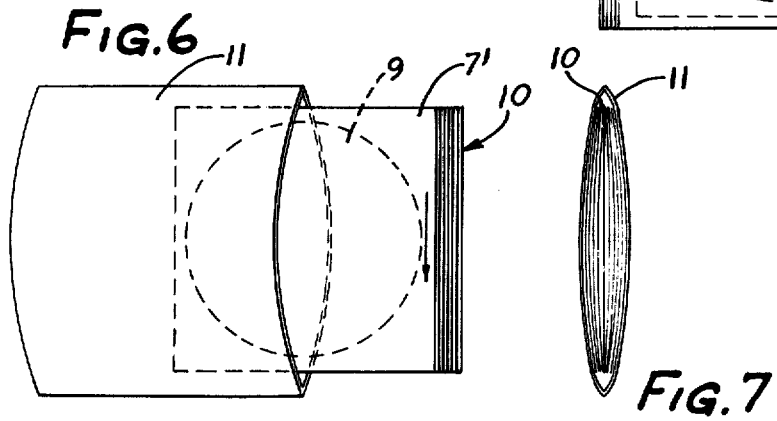
FIG.7
FIG.8

PACKAGING CONFECTIONERY PRODUCT

The present invention generally relates to a unique packaged confectionery product for use with another food product. More particularly, the present invention relates to a caramel sheet and packaging materials therefor, the caramel sheet to be used to enrobe an apple.

The coating of food products with confectionery products is known in the food industry. For example, it is well known to make a coated or enrobed product known as a candy apple. Candy apples are usually made by dipping an apple into molten caramel and causing a layer of the caramel to adhere to the surface of the apple. It is usually inconvenient to make a single unit of this coated confectionery product since larger amounts of caramel are required into which the apple can be completely immersed. The inconvenience and waste involved in heating such a larger quantity of caramel makes the dipping process of preparing candy apples difficult to utilize in other than multi-unit operations. It is because of this inconvenience and waste that the preparation of candy apples is undertaken with less frequency in the home. The hot molten caramel also presents some hazard in connection with dipping and handling of the apples.

Furthermore, the art has not provided caramel in a form which can be easily used to enrobe an apple or which, in such a form, can be adequately packaged and displayed. The art has failed to provide simple means for handling and providing caramel for enrobing an apple even though candy apples are a delicious confection for young and old persons.

Accordingly, it is a principal object of the present invention to provide a unique packaged confectionery product suitable for use in preparing a single unit of an enrobed food product. It is another object of the present invention to provide a process for packaging a confectionery product and which can then be used for enrobing a food product. It is a further object of the invention to provide means for enveloping or enrobing a food product with a confectionery product with minimum inconvenience and equipment expense so that the preparation of an enrobed food product can be readily accomplished in the home.

A still further object of the invention is the provision of means for providing and handling caramel in sheet form through distribution channels and marketing, which sheet is useable with an apple to provide a candy apple.

A still further object of the invention is the provision of means for providing and handling caramel in sheet form through distribution channels and marketing, which sheet is useable with an apple to provide a candy apple.

Other objects and advantages of the present invention will be apparent by reference to the following drawings and detailed description:

In the drawings:

FIG. 1 is a perspective view illustrating a piece of caramel on a web;

FIG. 2 is also a perspective view showing a second web over the caramel piece shown in FIG. 1 and an arrow indicating schematically the application of pressure;

FIG. 3 is another perspective view showing, in dotted outline, the caramel piece pressed into a sheet with an arrow indicating the machine direction of the web;

FIG. 4 is an end view of the webs and caramel sheet shown in FIG. 3;

FIG. 5 illustrates a stack of the caramel sheets between webs;

FIG. 6 is a generally perspective view showing the stack in FIG. 5 being inserted into an envelope with an arrow indicating the machine direction of the web;

FIG. 7 is an end view of the illustration in FIG. 6 with the stack wholly in the envelope; and FIG. 8 is a generally perspective view showing a pouch with a flap partially opened and the stack in the envelope within the pouch.

Generally, in accordance with the invention, a formable and stretchable confectionery product of particular formulation is provided and formed into a sheet of proper dimensions for formation about a unit of food product. The confectionary sheet is packaged in a particular manner for distribution and marketing so that the sheet is maintained in condition for later useage. In the latter connection, the unpackaged confectionery sheet may be shaped about the unit of food product so that the edges of the confectionery product overlap about the sides and over the opposite end of the food product to provide a food product enrobed with the confectionery sheet. The enrobed food product is then subjected to an elevated temperature sufficient to cause flowing of the confectionery product whereby the surface of the confectionery product is smoothed.

More particularly, the present invention is directed to a caramel having a particular formulation as the confectionery product and to the provision of the caramel in a sheet form. The sheet of caramel is particularly suitable for enrobing apples in the preparation of candy apples thereby avoiding the need for equipment, facilitating, coating and not requiring preparation of large quantities of caramel for dipping.

As used herein, the term "caramel" refers to a confection which includes water, sugar, protein, fat and flavoring materials. The caramel of the invention is formable and stretchable, and therefore pliable. The caramel may be partially grained but is not short and does not break when subjected to substantial stretching and bending.

The formulation of the caramel is important to provide the features of the invention. There are many caramel formulations in the art but a particular feature of the invention is the discovery of a particular formulation to achieve proper characteristics for packaging while at the same time assuring adequate pliability. More specifically, the formulation should not only provide pliability but should not flow significantly under ambient conditions so that the sheets may be packaged to stand on their edge. In addition, the formulation should not be too "sticky" so that packaging materials can be pressed onto the caramel and removed from the caramel without great difficulty. Further, the formulation should not be tough so that an unsatisfactory enrobed food product results.

The sugars in the caramel are sucrose and corn syrup solids. The corn syrup solids have a dextrose equivalent (DE) of from about 40 to about 80. Low DE corn syrup solids having a DE below about 40 are not suitable for use in the caramel of the invention because undue toughness is provided. However, such lower DE corn syrups may be used if compensated by addition of invert sugar, glycerine or sorbitol and equivalent results achieved. It has been determined that the ratio of corn syrup solids to sucrose is important in providing a caramel with suitable properties for use in the present invention. In this connection, the corn syrup solids should comprise a major portion of the total sugar in the caramel. If the weight ratio of corn syrup solids to sucrose is less than 1:1, the caramel undergoes an undesirable amount of graining during storage. An undue amount of graining causes the sheet of caramel to lose its stretchability and the caramel may split and crack when used to prepare the enrobed food product in accordance with the method of the invention. Generally, the ratio of corn syrup solids to sucrose should be from about 1:1 to about 5:1, by weight.

The protein in the caramel is preferably derived from milk. The milk protein may be casein or serum protein. The level of protein in the caramel should be higher than about 4 percent by weight. In this connection, it has been determined that the protein level is important to limit flowing of the caramel in a package prior to use of the caramel to provide an enrobed food product. As will be described more fully hereinafter, the package is a significant part of this invention. As indicated, if the level of protein in the caramel is less than about 4 percent by weight, the caramel sheets may flow during storage in the package and will either be thin on one side and thick on the other side, or will flow to an extent that all of the caramel sheets flow out of the packaging material, thus forming a mass of caramel on one side of the package. In general, the level of protein should be in the range of from at least about 4 percent to about 8 percent by weight of the caramel. Higher levels of protein can provide undesired toughness.

It has also been determined that the level of total solids in the caramel should be in the range of from about 87 percent by weight to about 93 percent by weight. If the level of solids is lower than about 87 percent by weight, the caramel tends to flow in the package even though the protein level is above about 4 percent by weight as previously described. If the level of solids in the caramel is above about 93 percent, the confection tends to be tough and difficult to stretch and form around a food product. The level of protein is inversely related to the solids level. Thus, with lower solids, higher protein levels are necessary and with higher solids, lower protein levels may be used. A proper balance is necessary to limit flow on the one hand and avoid toughness on the other hand.

The fat used in the caramel should be an edible fat having a softening point of above about 85°F. In this connection, the fat is preferably selected from hardened or partially hardened vegetable oils selected from the group consisting of soy bean oil, corn oil, cottonseed oil, coconut oil, safflower oil, cocoa butter, and mixture thereof. The fat may also be wholly or partially a milk derived fat, i.e., butterfat which has a softening point below 85°F. The fat should be present at a level of between about 6 percent and 13 percent in the formulation and appears to be an important feature in the packaging of the sheets. Some hard fat is desirable in the formulation in the event of extrusion of the caramel in connection with formation of a caramel sheet.

The caramel of the invention may be prepared by conventional procedures wherein a mixture of the ingredients is prepared and heated until the desired level of solids is attained. In a preferred method for preparing the caramel, the ingredients are mixed together in a suitable vessel. The mixture of ingredients is then passed through a thin film vacuum evaporator so as to reduce the moisture and increase the solids level to about 85 percent. Thereafter, the mixture is transferred to a tank where the mixture is heated to a temperature sufficient to caramelize the mixture. Generally, a temperature of from about 230°F. to about 240°F. is sufficient to effect caramelization. Thereafter, the hot mixture is transferred to a vacuum mixer where sufficient moisture is flashed off from the mixture to provide a caramel having the desired level of solids within the range of from about 87 to about 93 percent. Generally, the caramel exits from the vacuum mixer at a temperature in the range of from about 140°F. to about 160°F. The caramel may then be transferred to holding pans and held until it is used to prepare a sheet or it may be deposited or extruded onto a particular web material to be hereinafter described.

The sheet of caramel may be prepared by rolling a quantity of the caramel between a pair of rolls and thereafter cutting sheets of the desired configuration from the rolled product. However, a preferred method for preparing the caramel sheets is to place a predetermined amount of the caramel directly on the particular web material as shown in FIG. 1. A second web of the material is placed over the top of the predetermined amount of caramel as indicated in FIG. 2. A platen is then actuated to compress the caramel between the two webs of material. The webs are then cut to provide a sheet of caramel interposed between two webs (FIG. 3).

The web material should be of a substance which has release properties in respect to the compressed caramel. The web material should have sufficient rigidity so that the package of caramel sheets will stand on edge without slumping in the package and without forming striations. In this connection, paper materials are preferably used and are coated with a suitable release agent. Suitable release agents are edible lecithin, silicon compounds, and fatty acid metal complexes.

Plastic films are generally unsatisfactory as they do not provide sufficient rigidity, and although rigid plastics may be used and provide the desired release properties, such rigid plastics are unduly expensive and do not provide desired flexibility.

The caramel sheets may have various shapes but the compression of the material generally provides a circular shape which is most desired. The sheets should have a diameter between about 4 inches and about 7 inches to accommodate an apple and should be small enough so that some stretching is necessary but not so small as to require undue stretching. A diameter of about 5 to 6 inches has been found preferable. The sheet should have a thickness between about 1/32 inches and about 1/8 inches. The formulations, dimensions and thickness are correlated to provide stretch in the caramel sheets without breaking of between about 15 percent and 25 percent.

Now referring to the drawings, an amount of caramel comprising a piece 5 is placed upon a web 7, as shown in FIG. 1. The amount will be between about 1-¼ ounces and 1-¾ ounces to provide a caramel sheet of desired size and thickness. A second web 7' is then placed over the piece of caramel 5 and the covered caramel piece (FIG. 2) is compressed, as indicated by the arrow, to form a circular caramel sheet 9 as shown in dotted outline in FIG. 3.

The sheet is a parchment having a basis weight of between about 20 pounds per ream and about 40 pounds per ream. The parchment sheets have a machine direction (m.d.) indicated by the arrow in FIG. 3 and a cross machine direction (c.m.d.) which is transverse to the machine direction and which is important to note. A release agent is at least on one side of the webs 7 and 7', i.e., the side which faces on the caramel sheet, and preferably on both sides.

The release agent on the webs is preferably a product sold under trade name Quilon by E. I. du Pont de Nemours and Company, which permits desired separation of the webs from the caramel sheets. Wax coatings and release agents having low melting points below about 140°F. do not provide the desired release and are not particularly satisfactory. In the absence of a release agent, the caramel sheets stick to the parchment.

The pressure applied to the covered caramel piece 5 between the sheets 7 and 7' is desirably sufficient to effect some release of fat from the caramel.

The webs 7 and 7' may be in the form of precut sheets or may be provided from a roll stock. However, the parchment should have the machine direction of the webs going in like direction with lighter weight webs. The webs 7 and 7' are on opposite sides of the caramel sheet 9 to prevent undue sticking as shown in FIG. 3.

The caramel sheet 9 combined with the webs 7 and 7' are then stacked so that the machine direction of each web extends in like direction. A stack 10 of caramel sheets 6 high is shown in FIG. 4. The stacked sheets are then placed in an envelope 11 which is open-ended and which is so dimensioned as to pinch the stack 10 of combined caramel sheets at the top and bottom and this is important to provide the desired packaging. The envelope 11 is only slightly wider than the width of the stack of caramel sheets. The machine direction of the webs should extend from top to bottom, as shown by the arrow in FIG. 6, and the combining of the pinching of the stack at top and bottom with the proper disposition of the machine direction of the webs permits the desired packaging of the caramel sheets.

If the machine direction does not extend from top to bottom, the webs tend to crinkle when stood on end and cause striations in the caramel sheet which are undesired and result in breaking of the sheets when stretched over the food product.

With heavier and more rigid webs, the machine direction of the webs is of lesser importance. Similarly, if the webs were packed in a tube giving the webs structural strength by such packing, machine direction would be less critical.

The insertion of the stack of combined caramel sheets and webs is shown in FIG. 5 and FIG. 6 provides an end view of the stack in the envelope 11.

The envelope 11 containing the stacked caramel sheets is then placed in an overwrap comprising a pouch 13 as shown in FIG. 7. The pouch is shown with an open flap 15 which is closed. Stacks may be placed in the pouch for later use. The pouches containing the caramel sheets 9 may then be stacked on edge without undue flow of the product, formation of striations or weakening of the caramel sheets. As indicated, this result is achieved by proper formulation of the caramel and packaging in the manner described above.

To enrobe a food product with the caramel sheet 9, the pouch 13 is opened and a caramel sheet 9 disposed between the webs 7 and 7' is removed. The sheet is placed over the food product and stretched around it without tearing or breaking the caramel sheet. A stick may be inserted into the enrobed apple. The wrapped food product is placed on a web 7 or 7' and heated, as in an oven, to smooth out the caramel and complete the enrobing. Because of the release agent used, the web 7 or 7' does not stick to the caramel or to any carrier, such as a pan, which is placed in the heat. Thus, it is desirable for the release agent to be on both sides of the webs 7 and 7'. After heating, the enrobed food product is cooled and ready for consumption.

The following example further illustrates various features of the present invention but is intended to in no way limit the scope of the invention which is defined in the appended claims.

EXAMPLE

Sufficient quantities of the ingredients listed in the table below are mixed together to provide the indicated level of each ingredient, on a dry basis.

TABLE

| Ingredient | Weight Percent/Dry Basis |
|---|---|
| Corn syrup solids (63 DE) | 53.628 |
| Sugar (sucrose) | 16.849 |
| Condensed skim milk (35 percent solids) | 16.582 |
| Partially hardened cottonseed oil (92–95°F. softening point) | 7.929 |
| Whey solids | 2.000 |
| Butterfat | 1.955 |
| Hardened vegetable oil 105°F. softening point) | .661 |
| Salt | .396 |

The above ingredients are mixed together and heated to a temperature of 165°F. The heated mixture is then passed through a thin film heat evaporator and exits from the heat evaporator at a temperature of 204°F. and 86.25 percent solids. The mixture is then transferred to a tank provided with heating means and the mixture is heated to a temperature of 235°F. The mixture is held in the tank for a time sufficient to caramelize the mixture and effect desired color development. Vanilla flavoring is then added to the mixture and the mixture is transferred to a vacuum mixer. In the vacuum mixer, moisture is flashed from the mixture and a solids level of 90.5 percent is attained to provide the caramel of the invention. The discharge temperature of the confection from the vacuum mixer is 145°F. The caramel is then transferred to holding pans and is held until required for use.

50.9 grams (1.79 ounces) of the caramel are deposited in the center of a continuous web 7 of parchment. The web has a width of 7 inches. A second web 7' is moved into place over the portion of caramel deposited on the first web 7. Each of the parchment webs is previously treated on each side with a fatty acid chromium complex release agent available from E. I. du Pont de Nemours and Company under the tradename Quilon. The webs of parchment are moved into position beneath a platen and are stopped until the platen is actuated. The platen is mechanically operated and is actuated when the portion of caramel product is stopped beneath the platen. The platen is depressed to flatten the portion of caramel between the webs of parchment and provide a circular sheet 9 of caramel having a diameter of about 6 inches. The webs are then cut transversely to provide a 7 inch square of 2 sheets of parchment having innerposed therebetween a 6 inch circle of caramel having a thickness of about 1/16 inch. The pressure applied causes some fat release from the caramel.

After cutting of the webs, the caramel sheet is cooled to a temperature of 70°F. ± 5°. The caramel sheets are then ready for packaging in the manner hereinbefore described.

A single portion of the caramel which has been compressed into a sheet 9 as described above is used to enrobe an apple. The parchment is stripped from the sheet of caramel and an apple is placed in the center of the sheet. The caramel is folded upwardly and across the top of the apple and a stick is inserted through the caramel and into the apple to secure the caramel about the apple. The enrobed apple is then placed on a web 7 or 7' in an oven which has been preheated to a temperature of 300°F. The enrobed apple is permitted to remain in the oven for a period of one minute and is then removed. Alternatively, the enrobed apple may be placed in a 200°F. oven for 5 minutes. The caramel has flowed about the apple and is securely affixed to the apple and no irregular edges are observed. The enrobed apple is cooled.

Of course, the caramel sheets may be packaged as hereinbefore described for distribution and marketing.

The present invention provides the home user a simple means to prepare a single unit of a confection coated food product, such as a candy apple.

We claim:

1. A method for preparing an enrobed food product of irregular shape comprising forming a sheet of a caramel confectionery product, said caramel confection product comprising sugars including corn syrup solids having a DE between about 40 and about 80 and sucrose, the weight ratio of corn syrup solids to sucrose being greater than 1:1; milk protein at a level in excess of 4 percent; milk fat or edible fat having a softening point above 85°F and at a level between about 6 percent and about 13 percent; and total solids at a level of between about 87 percent and 93 percent, wrapping said sheet around said food product, placing said wrapped food product at a temperature at which said confectionery product will flow for a time sufficient to smooth the surface of said confectionery product, and cooling the enrobed food product, said sheet being formed by placing a piece of the confectionery product on a web and compressing the piece onto the web to thereby form a generally circular sheet.

2. A method in accordance with claim 1 which further comprises compressing said product sufficiently to cause fat release to the surface of the confectionery product.

3. A method in accordance with claim 1 wherein the web is coated with a release agent on the side contacting the confectionery product.

4. A method in accordance with claim 1 wherein the piece is covered with a web on each side and compressing is effected from outwardly of the webs.

5. A method in accordance with claim 4 wherein the webs are coated with a release agent on the sides contacting the confectionery product.

6. A caramel confectionery product comprising sugars including corn syrup solids having a DE between about 40 and about 80 and sucrose, the weight ratio of corn syrup solids to sucrose being greater than 1:1; milk protein at a level in excess of 4 percent; milk fat or edible fat having a softening point above 85°F and at a level of between about 6 percent and about 13 percent; and total solids at a level between about 87 percent and 93 percent; said caramel confectionery product being in the form of a plurality of sheets of said confectionery product, each of said sheets having a web compressed on at least one side thereof, each of said sheets having a thickness between about 1/32 inches and 1/8 inches, and said sheets having fat on the surface thereof; said plurality of sheets being arranged in a stack with an envelope surrounding said stack thereby providing a package of a plurality of said caramel sheets, whereby each of said caramel sheets is adapted to enrobe a food product of irregular shape.

7. A confectionery product in accordance with claim 6, the webs having a release agent thereon.

8. A confectionery product in accordance with claim 7, the release agent being selected from the group consisting of lecithin, silicon compounds and fatty acid metal complexes.

9. A confectionery product in accordance with claim 6 having a web compressed onto each side of the sheet.

10. A confectionery product in accordance with claim 9, the webs having a release agent thereon.

11. A package in accordance with claim 6 wherein the envelope pinches an outer edge of the stack.

12. A confectionery product in accordance with claim 6 wherein the webs are paper.

13. A confectionery product in accordance with claim 6 wherein the webs are parchment paper.

* * * * *